United States Patent [19]

Liu

[11] Patent Number: 5,409,739
[45] Date of Patent: Apr. 25, 1995

[54] MONOLAYER COATING

[75] Inventor: Guojun Liu, Calgary, Canada

[73] Assignee: University Technologies International Inc., Canada

[21] Appl. No.: 123,328

[22] Filed: Sep. 17, 1993

[51] Int. Cl.$^6$ .............................................. B05D 3/06
[52] U.S. Cl. .................................. 427/512; 427/522; 427/443.2; 427/388.2
[58] Field of Search ............... 427/508, 512, 520, 521, 427/522, 435, 443.2, 388.2

[56] References Cited

U.S. PATENT DOCUMENTS

| | | | |
|---|---|---|---|
| 3,265,765 | 8/1966 | Holden et al. | 260/876 |
| 3,674,486 | 7/1972 | Milgrom | 96/35.1 |
| 3,892,665 | 7/1975 | Steigelmann et al. | 210/490 |
| 4,585,670 | 4/1986 | Liu | 427/521 |
| 4,929,510 | 5/1990 | Ruckenstein et al. | 428/520 |
| 5,098,569 | 3/1992 | Stedronsky | 210/500.29 |
| 5,135,297 | 8/1992 | Valint, Jr. | 351/160 R |

OTHER PUBLICATIONS

Polyethylene Oxide as a Biomaterial, American Society for Artificial Internal Organs Journal, Apr./Jun. 1983, pp. 60–64, Merrill et al.

Study of Photooxidation of Styrene–Butadiene Copolymers by Surface Pressure Measurements at the Air–Water Interface, J. of Macromolecular Science–Physics, B23 (3)341–362 (1984), Subramanian et al.

Kato et al, Polymer Letters, vol. 8, pp. 263–265 (1970). Photopolymers From β–Vinyloxyethyl Esters of Cinnamic Acid and Styryl Acrlic Acid.

Kato et al, Journal of Polymer Science, Part A–1, vol. 9, pp. 2109–2128 (1971).

Gast, A. P., "Block Copolymers at Interfaces," from *Scientific Methods for the Study of Polymer colloids and Their Applications* (Candau, F. and R. H. Ottewill, eds., Kluwer Academic Publishers, Netherlands 1990, pp. 311–328).

Lee, J. H., et al., "Protein-resistant surfaces prepared by PEO-containing block copolymer surfactants," *Journal Biomedical Materials Research* 23: 351–368 (1989).

Milner, S. T., "Polymer Brushes," *Science* 251: 905–914 (1991).

Parsonage, E., et al., "Adsorption of Poly(2-vinylpyridine)-Poly(styrene) Block Copolymers from Toluene Solutions," *Macromolecules* 24: 1987–1995 (1991).

Stouffer, J. M., and T. J. McCarthy, "Polymer monolayers Prepared by the Spontaneous Adsorption of Sulfur-Functionalized Poly-styrene on Gold Surfaces," *Macromolecules* 21: 1204–1208 (1988).

Ulman, A., "Self-Assembled Monolayers," Part Three from *An Introduction to Ultrathin Organic Films–From Langmuir–Blodgett to Self-Assembly* (Academic Press, Boston 1991, pp. 237–305).

Primary Examiner—Shrive Beck
Assistant Examiner—Erma Cameron
Attorney, Agent, or Firm—Peter J. Dehlinger; Vincent M. Powers

[57] ABSTRACT

A process for producing an essentially monolayer coating of crosslinked polymer on a substrate, in which a block copolymer is introduced into a semi-solvent which solvates only one block of the copolymer, the resultant block copolymer semi-solution is contacted with a substrate, and the copolymer is then crosslinked.

13 Claims, No Drawings

MONOLAYER COATING

FIELD OF THE INVENTION

This invention relates to a process to provide an essentially monolayer, crosslinked polymeric coating on a substrate.

BACKGROUND OF THE INVENTION

The thin layer coating of substrates with dilute solutions of diblock copolymers has been the subject of considerable academic interest. For example, a recent paper by Budkowski et al provides a description of the phenomena that are speculated to occur when an A–B type block copolymer is used to coat a substrate, namely that one of the blocks (for example, block A) attaches to a surface and that the other block (ie. block B) ". . . dangles out to form a brushlike layer . . . " (Budkowski et al, Macromolecules 1993, 26, p2470). Budkowski et al further describes the use of such A/B block copolymers to improve the interface between a layer of homopolymer A and homopolymer B (ie. in such applications, the A/B block copolymer layer is sandwiched between a layer of homopolymer A and homopolymer B).

The use of diblock copolymer to provide a thin coating is of potential commercial interest. However, the simple deposition of a diblock copolymer on a substrate leaves a very thin layer coating which is subject to ready attack (for example, it may be easily dissolved away, or abraded or attacked by an acid/base). Whilst the problem of this type of attack may not be severe in the application describe by Budkowski et al (because the thick layer of the AB diblock is "protected" by a layer of homopolymer A and a layer of homopolymer B), it presents a substantial problem if the coating is to be exposed. It is an object of the present invention to address this problem by employing a process which provides a thin layer of crosslinked copolymer on a substrate.

SUMMARY OF THE INVENTION

The present invention provides:

A process for producing a crosslinked, essentially monolayer coating of crosslinked polymer on a substrate, said process consisting of:

(a) providing a block copolymer having a general formula:

$$(A)_m(B)_n$$

wherein A represents a first block segment, B represents a second block segment, m is greater than or equal to 5 molar units, n is greater than or equal to 5 molar units, and at least one of said first block segment and second block segment contains crosslinkable moieties;

(b) introducing said block copolymer into a block selective solvent which is a good solvent for only one of said first block segment or said second block segment, thereby preparing a block copolymer semi-solution having a solvated block segment and an essentially non-solvated block segment;

(c) contacting said substrate with said block copolymer semi-solution, thereby producing an essentially monolayer coating on said substrate; and (d) providing activation energy to said coating, thereby activating said crosslinkable moieties so as to crosslink said essentially monolayer coating.

In a preferred embodiment, the minimum value of m & n are 10 and 10 respectively.

DETAILED DESCRIPTION

The process for the present invention requires a block copolymer having at least two distinct block segments, as described by the formula $$(A)_m(B)_n$$

where A, B, n and m are defined above.

The term "block copolymer" as used herein is meant to convey its conventional meaning. Block copolymers are characterized by a) being produced from more than one monomer unit and by b) a polymer structure which contains "block" (ie. side-by-side repeat units) of the same monomer.

The block copolymer of the present invention must contain at least one first block segment A which contains 5 or more, preferably 10 or more, monomer units (note that this definition excludes the use of simple low molecular weight surfactants which are sometimes used for thin layer coating but which are not suitable for use in the present invention).

The monomer units used to produce the first block are different than the monomer units used to prepare the second block.

The present block copolymer is further characterized in that at least one of the first block segment and the second block segment contains crosslinkable moieties.

It will be evident to those skilled in the art that a very large variety of block copolymers which satisfy the above criteria may be synthesized using conventional block-polymerization techniques. The following list provides a non-limiting description of suitable block units:

First block: poly(methacrylates, poly(acrylates), polystyrene and derivatives, poly(α-methyl styrene) and derivatives, polyesters, poly(ethylene oxide), poly(vinyl alcohol), poly(vinyl ethers), polyimides, polyamides, poly(siloxanes), poly(butadiene), poly(isoprene) and poly(iso-butyl vinyl ether)

Second block: poly[2-(vinyloxy)ethyl cinnamate], polybutadiene, polyisoprene, poly(vinyl cinnamate), poly(vinyloxyethylchalcones), poly(β-vinyloxyethyl β-styrylacrylate), poly(vinylphenyl α-styrylacrylates), and poly(ethylene dimethacrylate).

At least one of the block segments must contain crosslinkable moieties such as a group consisting of cinnamates, chalcones, residual double bonds from polybutadine and polyisoprene and poly(ethylene dimethacrylate), maleimides, anthracene, coumarins and diacetylenes, so as to enable the subsequent crosslinking of that block. The crosslinking reaction is preferably activated by an energy source selected from thermal energy (ie. the crosslinking is thermally induced) and UV radiation (ie. the crosslinking is induced by exposure to UV light).

Any convenient polymerization technique which produces block copolymers may be employed to prepare the copolymers which are employed in the present invention. These polymerization techniques are extensively described in the open literature and do not themselves constitute an inventive element of the present technology. As a brief review there are two techniques which are particularly well known to produce "block" copolymers. In the first technique, an "ionic" catalyst system (which may be anionic or cationic) is used to prepare a "living" polymerization of a first monomer, followed by the polymerization of a second monomer. The anionic polymerization (for example using an alkyl lithium catalyst, such as butyl lithium) of a single aromatic monomer (such as styrene), followed by the polymerization of a conjugated diene (such as butadiene) is one example of such a technique which is in widespread commerical use. This technique is used to produce, for example, block styrene-butadiene copolymers which are sold under the trademark KRATON by the Shell Oil Company.

It will be recognized that this technique may also be readily used to produce "triblock" copolymers (ie. which contain three distinct blocks segments) and multiblock copolymers. The term "block copolymer" as used herein is meant to include such triblock and/or multiblock copolymers (ie. the block copolymers of the preset invention must contain the first block segment $(A)_m$ and the second block segment $(B)_n$ as previously defined, but may also include additional block units).

Another technique which is known to produce block copolymers is to polymerize a first block, then polymerize a second block, then "couple" the first block to the second block in a coupling reaction (especially by a condensation reaction).

For reasons of convenience, it is particulary preferred to employ the first-described "living" polymerization technique.

The process of the present invention also requires the use of a "selected solvent". Specifically, the solvent must be one which is a "good solvent" for one block segment (eg. block $(A)_m$ as described above) but a poor solvent for the other second block segment (eg. block $(B)_n$ above). The selected solvent is then mixed with the block copolymer so as to prepare a "semi-solution" in which one block of the copolymer is well dissolved and the other is not.

In a preferred procedure for preparing the above described "semi-solution", a combination of two solvents is employed. The first solvent is a good solvent for both of the block copolymer segments, and is used to prepare an initial solution of the block copolymer. The second solvent is a non-solvent (or very poor solvent) for one of the segments. This second solvent is added to the initial solution until visible cloudiness is just observed (which indicates that one of the segments is starting to come out of the solution). Examples of block selective solvents include an ethyl acetate/hexane, mixture hexane, dimethyl acetamide, and ethyl acetate.

The polymer concentration of the block copolymer semi-solution used in the present invention is preferred to be comparatively dilute (especially from 0.1 to 50 grams of the block copolymer per litre of the semi-solution).

The block copolymer semi-solution is then used to provide a thin (essentially monolayer) coating on a substrate. This may be done, for example, by spraying some of the semi-solution onto the substrate or by immersing the substrate into the semi-solution.

It is not intended to limit the present process to any particular substrate. However, the following materials represent examples of substrates which may be used in the process of this invention: glass, silica, metal, inorganic salts and organic polymers.

In the final step of the present process, the crosslinkable moieties which are contained in at least one of the block segments are crosslinked.

It is especially preferred that the substrate consist of the bead materials used to pack the columns employed in high pressure liquid chromatography (HPLC) analysis, or that the substance be a capillary tube or the type used in gel electrophoresis.

In summary, the process of the present invention might be described by the following steps:
  a) selection of a block copolymer in which at least one block has crosslinkable moiety;
  b) preparation of a semi-solution of the block copolymer;
  c) coating of a substrate with the semi-solution; and
  d) crosslinking the crosslinkable moiety.

The process of the present invention provides a substrate with a thin (essentially monolayer) coating of the block copolymer.

In the best mode of the invention as presently known, the block copolymer contains an isobutyl vinyl ether (IBVE)-derived block and a vinyloxyethyl cinnamate (VOEC)-derived block. It is believed that this block copolymer is a novel composition of matter. The IBVE/VOEC block copolymer may be conveniently prepared by polymerization in the presence of ethylalumimun dichloride.

A semi-solution of the IBVE/VOEC block copolymer is prepared by first dissolving it in ethyl acetate (a good solvent for both blocks), followed by the addition of hexane (a poor solvent for the VOEC block) until the solution just becomes cloudy. The resulting semi-solution is used to coat a glass substrate, and the blockpolymer is crosslinked by exposure to a UV beam obtained by filtering the light from a 1000 watt mercury lamp through a 260 mm cut off filter.

Further details for the present invention are provided by the following non-limiting examples.

EXAMPLES

Example 1.

Preparation of poly(isobutylvinyl ether)-*block*-poly[2-(vinyloxy)ethyl cinnamate) (PIBVE-*b*-PVOEC)

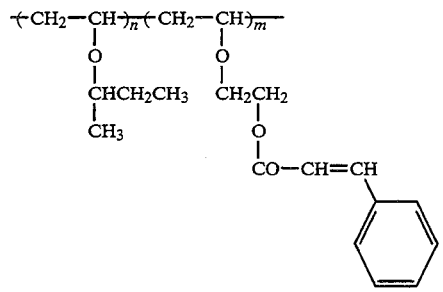

Toluene (84 ml), isobutylvinyl ether (IBVE) (3.1 ml, 2.4 g, 24 mmol), dioxane (3.3 ml, 38 mmol) and 1-(isobutoxy)ethyl acetate (0.039 ml, 0.035 g, 0.22 mmol) were injected into a previously well-evacuated and flamed 250-ml three-neck, round-bottom flask using syringes at room temperature in an argon-filled glove bag. The flask was then attached to a previously evacuated and flamed but now argon-filled vacuum line. The mixture was stirred and chilled to $-78°$ C. 1.2 ml of a solution of Ethylaluminum dichloride (EtAlCl$_2$) in mixed hexanes (concentration: 1.0M) was injected into it under the flow of argon to start the polymerization of IBVE. The reaction mixture was subsequently warmed to 0° C. by changing the dry ice acetone bath to iced water bath. During the 3-hour polymerization at 0° C., the mixture was initially colorless, turned pale yellow after about 2.5 hours, and eventually became reddish orange. At that time, a small aliquot of sample was taken from the reaction flask for reactant and product analysis, which showed almost complete conversion of IBVE. The weight average molar mass of PIBVE was determined by gel permeation chromatography (GPC) to give a polystyrene equivalent peak molar mass $8.9 \times 10^3$ g/mole. The GPC chromatogram was approximately Gaussian in shape and as a qualitative observation, the molecular weight distribution was fairly narrow.

The second monomer, 2-(vinyloxy)ethyl cinnamate (VOEC) (5.1 ml, 6.1 g, 29 mmol), was then added to the polymerization mixture, the reaction was continued for another 4 hours at 0° C., and terminated using 50 ml 6:1/methanol:ammonia mixture. The crude mixture was washed twice with 3.6% hydrochloric acid in water and twice with water. The organic layer was dried with $CaCl_2$ (to remove trace water). Evaporation of the solvent gave crude product as a yellow oil. It was purified by precipitation twice from methanol. The precipitate was dried under vacuum to yield 6.3 g of solid polymer, yield 74%. NMR analysis of the final product showed that IBVE to VOEC molar ratio in the final polymer was 1/1.2, the same as the theoretical value. The GPC peak molecular mass for the block copolymer was $1.7 \times 10^4$ g/mole.

Example 2.

Coating Microscope Glass Slides With (PIBVE-b-PVOEC)

PIBVE-b-PVOEC block copolymer from example 1 was fractionated by fractional precipitation of the polymer from ethyl acetate by adding methanol. One fraction which had an IBVE to VOEC molar ratio of 1/1 was dissolved in 33.9-ml ethyl acetate, a good solvent for both blocks. An aliquot of 16.9-ml hexanes, a poor solvent for the PVOEC block, is added to the solution dropwise to turn it just cloudy. At this point, a few drops of ethyl acetate were added to the solution mixture to make it clear again and the polymer concentration was 20 g/L. The mixture was filtered through a 0.45-μm hydrophobic filter (Millipore). A microscope glass slide (previously boiled in concentrated nitric acid for 3 hours, rinsed with distilled water, and vacuum-dried) was then immersed in the filtered mixture to allow the deposition of a self-assembled polymeric monolayer on its surface. After a period of time (as indicated in table 1), the glass slide was removed and rinsed in a solvent mixture consisting of the same ratio, 19/9, of ethyl acetate/hexanes used in preparing the coating solution. The polymer coating on the slide was then cross-linked for 15 minutes on each side, using a UV beam passing through a 260-nm cut-off filter from a 1000-watt mercury lamp (Oriel Corporation).

The polymer coated glass slides prepared according to the procedure of this example have the PIBVE block exposed to the atmosphere. PIBVE is a hydrophobic polymer, and it is well known that the interaction between a hydrophobic polymer and water is poor. This poor interaction means that water does not spread very well on the surface. This phenomenon may be measured using the well known "water contact angle" procedure which is described, for example, by Arthur W. Adams in Physical Chemistry of Surfaces (Wiley Interscience, New York, 1990). A general overview of the water contact angle procedure is as follows:

1. An *aliquot* (about 0.02 ml) of distilled water is dispensed onto the surface being studied. The surface should be contained within an enclosed ceil, in which very hugh humidity is present.
2. The water droplet is allowed to reach equilibrium with its surroundings (about 15 minutes).
3. A picture is then taken of the droplet. The droplet can normally be approximated as an arc or spherical cap. The contact angle is the angle between the surface and a tangent to the full circle which would be described by extending the arc of the water droplet.

Table 1 illustrates values of water contact angles obtained as a function of soaking time in the polymer semi-solution. The quick increase in contact angle with a relatively low soaking time (from 39 to 77 degrees after 10 minutes of soaking) shows that the rate of polymer deposition is comparatively fast.

Example 3.

Coating Capillary Tubes

Un-deactivated fused-silica capillary tubes with internal diameters of either 0.32 or 0.25 mm similar to those which may be used for gas chromatography and/or capillary electrophoresis were purchased from Chromatography Specialties Inc. To facilitate the viewing of "water rising levels", all capillary tubes were treated to strip off the polyimide protective coating on their outside wall. This was done by burning. The inner wall (also the outer wall) of a capillary tube was coated by immersing it in a polymer semi-solution using the procedure as described in example 2 with the exception that capillary. tubes, instead of glass slides, were used in this example.

The polymer film on the wall of a capillary tube was cross-linked by initially exposing the capillary tube to UV radiation for 15 minutes on one side of the tube, then rotating it 180° and irradiating the other side for another 15 minutes.

The height of distilled water which rose in the capillary tubes was then determined. Results are shown in Table 1. As shown in Table 1, a soaking time in polymer semi-solution of only 1 minute was sufficient to reduce the "water rising height" from 58 to 3.4 mm.

Example 4.

Chloroform Resistance of Photo-Cured and Uncured Coatings

Glass slides or capillary tubes which are coated with photo-cross-linked PIBVE-b-PVOEC are compared to those which are coated with uncross-linked polymers. Coatings which are not photo-cured can be rinsed off with chloroform. A glass plate which is coated with an uncross-linked film and then soaked in chloroform can regain the low water contact angle. A capillary tube will regain high water rising level. In Table II, the contact angles of water on different plates and the water rising levels in different capillary tubes is shown as a function chloroform soaking time. It is obvious from these results that the polymer layer is not adversely affected for the cross-linked samples as judged from the results of either contact angle measurement or water rising level measurement. For uncross-linked samples, immersion in CHCl$_3$ strips polymer away from the glass surface, which causes the contact angle to decrease for the glass plate case and the water level to increase in the capillary tube case.

The plates and capillary tubes used in this study were prepared by soaking them in the polymer semi-solution for 2 and 4 hours, respectively. For cross-linking of polymer films on glass plates, they were irradiated on one side for 30 minutes using the Hg lamp mentioned above. The crosslinking of polymer films on capillary walls was done using the procedure as described in Example 3. After soaking a sample in CHCl$_3$ for a given amount of time, it is dried under vacuum for 1 to 2 hours, and then either water contact angle or water rising level was determined. For the set of data presented in Table II, the water rising height readings were taken after capillary tubes had been in contact with water for 1 minute.

Example 5.

Nitric Acid Resistance of Photo-Cured and Uncured Coatings

Photo-cured and non-cured PIBVE-b-PVOEC monolayer coatings are tested for their resistance to 5% (weight/weight) nitric acid. Nitric acid does not dissolve the block copolymer. Upon reaching the glass and polymer interface, nitric acid may cause the film to delaminate. A partially delaminated film looks cloudy at delamination points, because after nitric acid has been pumped out under vacuum air voids are left at the polymer and glass interface at those delamination points and these air voids scatter light. Thus, the measurement of the turbidity of an acid soaked film would allow the monitoring of the delamination process. Also, it was hoped that film delamination might cause the surface tension of a coated glass substrate to change and thus allow an alternative method for the monitoring of the delamination process.

For the nitric acid resistance experiment, glass plates or capillary tubes were prepared in the same fashion as described in Example 4. Results of water contact angle measurement for glass plates with cross-linked coatings are presented in Table III. They are basically unaffected by the immersion process in acid. This was confirmed by the similar light transmission efficiency of glass plates which have been coated with cross-linked films and have been soaked in nitric acid for different periods of time. On the other hand, the immersion of glass plates coated with uncross-linked polymer films in nitric acid for about 20 minutes caused certain areas, about 10% of the total area, of a glass plate to turn cloudy. Due to the non-uniform distribution of the cloudy domains, accurate measurement of water contact angles on those plates was difficult. For a given sample, the contact angle measured depended on the region in which the water drop was dispensed. For the glass plate which was immersed in nitric acid for 2 hours, the contact angle measured varied, for example, from 56 to 77 degrees in four measurements. Similarly, the light transmission efficiency of the glass plate at 595 nm varied from 81.2% to 88.6% in four measurements, again depending on where on the plate the measurement was carried out.

Results of nitric acid resistance experiments performed using capillary tubes are presented in Table III. While soaking capillary tubes coated with cross-linked films in nitric acid did not lead to any appreciable change in water rising level, soaking those coated with uncross-linked films caused water rising level to increase gradually, an indication of film delamination.

Example 6.

The Efficiency of the Photo-Cross-linking Reaction

The efficiency of PIBVE-b-PVOEC cross-linking on a glass substrate was tested by measuring the contact angles of water on coated glass plates which have been irradiated for different periods of time and then soaked in CHCL$_3$ for 15 minutes. Those films which do not have sufficiently high cross-linking density are expected to be washed off from the glass surface and thus the water contact angle will decrease. Experimental results are shown in Table IV, which indicates that the cross-linking reaction is highly efficient, because one minute of radiation is sufficient for producing an insoluble film. The high cross-linking efficiency suggests that chains of the PVOEC block interpenetrate with one another and that the surface covering density is high.

TABLE I

The Efficiency of the Polymer Deposition Process as Revealed from Surface Tension Changes of Coated Substrates with Their Immersion Time in a Polymer Semi-Solution

| Soaking time in Polymer Semi-Solution (Minutes) | Water Rising Height in Capillary (mm) | Water Contact Angle on Glass Plates (Degrees) |
| --- | --- | --- |
| 0 | 58 | 39 |
| 1 | 3.4 | |
| 5 | 2.5 | |
| 10 | 3.2 | 77 |
| 15 | 3.0 | |
| 30 | 2.9 | 78 |
| 60 | 2.4 | 75 |
| 120 | 1.5 | 82 |
| 180 | 1.2 | |
| 240 | 1.1 | 80 |
| 360 | | 81 |
| 480 | | 82 |
| 600 | | 79 |

TABLE II

Solvent (Chloroform) Resistance of Photo-Cross-Linked and Non-Cross-Linked Monolayer Coatings

| Soaking time in CHCl$_3$ (minutes) | Water Rising Height for Cross-Linked Coating on Capillary Wall (mm) | Water Rising Height for Non-Cross-Linked Coating on Capillary Wall (mm) | Water Contact Angle on Glass Plate Coated with a Cross-Linked Layer (Degrees) | Water Contact Angle on Glass Plate Coated with a Non-Cross-Linked Layer (Degrees) |
| --- | --- | --- | --- | --- |
| 1 | 0.2 | 10.5 | | |
| 2 | | | 79 | 72 |
| 4 | | | 80 | 66 |
| 5 | 0.2 | 15 | | |
| 6 | | | 79 | 55 |
| 8 | | | | |
| 10 | 0.2 | 19 | 82 | 53 |

TABLE II-continued

Solvent (Chloroform) Resistance of Photo-Cross-Linked and Non-Cross-Linked Monolayer Coatings

| Soaking time in CHCl$_3$ (minutes) | Water Rising Height for Cross-Linked Coating on Capillary Wall (mm) | Water Rising Height for Non-Cross-Linked Coating on Capillary Wall (mm) | Water Contact Angle on Glass Plate Coated with a Cross-Linked Layer (Degrees) | Water Contact Angle on Glass Plate Coated with a Non-Cross-Linked Layer (Degrees) |
|---|---|---|---|---|
| 12 |  |  | 80 | 56 |
| 15 | 0.2 | 20 |  |  |
| 16 |  |  | 79 | 47 |
| 20 | 0.2 | 20 |  |  |
| 25 |  |  | 80 | 41 |
| 30 | 0.2 | 19 | 80 | 57 |

TABLE III

Coating Resistance to 5% Nitric Acid

| Immersion Time in HNO$_3$ (Minutes) | Water Rising Height in Capillary with Cross-Linked Coating (mm) | Water Rising Height in Capillary with Non-Cross-Linked Coating (mm) | Water Contact Angle on Glass Plate with Cross-Linked Coating (Degrees) |
|---|---|---|---|
| 1 | 0.2 | 7 |  |
| 5 | 0.2 | 13 |  |
| 10 | 0.2 | 16 | 80 |
| 15 | 0.2 | 18 |  |
| 20 | 0.2 | 13 | 81 |
| 30 | 0.2 | 26 | 83 |
| 60 |  |  | 80 |
| 120 |  |  | 81 |
| 180 |  |  | 78 |
| 8880 |  |  | 79 |

TABLE IV

Efficiency of the Cross-Linking Reaction

| UV Irradiation Time (minutes) | Water Contact Angle After Soaking in CHCL$_3$ for 15 Minutes (Degrees) |
|---|---|
| 0 | 47 |
| 1 | 76 |
| 2 | 78 |
| 5 | 79 |
| 10 | 77 |
| 15 | 78 |
| 25 | 79 |
| 30 | 77 |

I claim:

1. A process for producing a crosslinked, essentially monolayer coating of crosslinked polymer on a substrate, said process consisting of:
   (a) providing a block copolymer having a general formula:

$(A)_m(B)_n$ wherein A represents a first block segment, B represents a second block segment, m is greater than or equal to 5 molar units, n is greater than or equal to 5 molar units, and at least one of said first block segment and said second block segment contains crosslinkable moieties;
   (b) introducing said block copolymer into a block selective solvent which is a solvent for only one of said first block segment or said second block segment, thereby preparing a block copolymer semi-solution having a solvated block segment and an essentially non-solvated block segment;
   (c) contacting said substrate with said block copolymer semi-solution, thereby producing an essentially monolayer coating on said substrate; and
   (d) providing activation energy to said coating, thereby activating said crosslinkable moieties so as to crosslink said essentially monolayer coating.

2. The process according to claim 1, wherein the source of said activation energy is selected from thermal energy and UV radiation.

3. The process according to claim 1 wherein only said essentially non-solvated block segment contains said crosslinkable moieties.

4. The process according to claim 1 wherein said block copolymer is a triblock copolymer.

5. The process according to claim 1 wherein said block copolymer semi-solution has a concentration from 0.1 to 50 grams of said block copolymer per litre of said semi-solution.

6. The process according to claim 1 wherein said substrate is a material selected from the group consisting of glass, silica, metal, inorganic salts and organic polymers.

7. The process according to claim 6 wherein said material is in the form of a glass plate.

8. The process according to claim 6 wherein said material is in the form of a silica gel.

9. The process according to claim 1 wherein said block copolymer is formed by a polymerization process selected from the group consisting of anionic polymerization, cationic polymerization and condensation polymerization.

10. The process according to claim 1 wherein said first block segment is selected from the group consisting of poly(methacrylates), poly(acrylates), polystyrene and derivatives, poly(α-methyl styrene) and derivatives, polyesters, poly(ethylene oxide), poly(vinyl alcohol), poly(vinyl ethers), polyimides, polyamides, poly(siloxanes), poly(butadiene), and poly(isoprene) and said second block segment is selected from the group consisting of poly[2-(vinyloxy)ethyl cinnamate], polybutadiene, polyisoprene, poly(vinyl cinnamate), poly(vinyloxyethylchalcones), poly(β-vinyloxyethyl β-styrylacrylate), and poly(vinylphenyl α-styrylacrylates).

11. The process according to claim 10 wherein said block A is selected from the group consisting of poly(i-so-butyl vinyl ether) and polystyrene and the said block B is selected from the group consisting of poly[2-(vinyloxy)ethyl cinnamate], poly(vinyloxyethylchalcone), and polybutadiene, and said block selective solvent is selected from the group consisting of an ethyl acetate/hexane mixture, hexane, dimethyl acetamide, and ethyl acetate.

12. The process according to claim 1 wherein said cross-linkable moieties are selected from the group consisting of cinnamates, chalcones, residual double bonds from polybutadiene and polyisoprene, maleimides, anthracene, coumarins, and diacetylenes.

13. The process according to claim 3 wherein said cross-linkable moieties are selected from cinnamates and chalcones.

* * * * *